United States Patent [19]

Newbolt et al.

[11] Patent Number: 5,350,257
[45] Date of Patent: Sep. 27, 1994

[54] PNEUMATIC CONVEYOR FOR GRANULAR MATERIALS

[75] Inventors: Richard E. Newbolt; Theodore L. Remmers, both of Sabetha, Kans.

[73] Assignee: Mac Equipment, Inc., Sabetha, Kans.

[21] Appl. No.: 180,573

[22] Filed: Jan. 12, 1994

Related U.S. Application Data

[63] Continuation of Ser. No. 946,664, Sep. 18, 1992, abandoned.

[51] Int. Cl.$^5$ .............................................. B65G 53/40
[52] U.S. Cl. ..................................... 406/75; 406/122; 406/146
[58] Field of Search ................... 406/73, 75, 122, 124, 406/134, 136, 146

[56] References Cited

U.S. PATENT DOCUMENTS

| | | | |
|---|---|---|---|
| 3,001,829 | 9/1961 | De Saint-Martin | 406/146 X |
| 3,090,593 | 5/1963 | Pro | 406/124 X |
| 3,804,303 | 4/1974 | Fassauer | 406/124 X |
| 3,973,703 | 8/1976 | Peschl | 222/199 |
| 4,514,114 | 4/1985 | Fuss et al. | 406/146 X |
| 4,799,831 | 1/1989 | Ariaz | 406/136 |

FOREIGN PATENT DOCUMENTS

| | | | |
|---|---|---|---|
| 2103060 | 7/1971 | Fed. Rep. of Germany | 406/122 |
| 1293862 | 4/1962 | France | 406/122 |
| 1324963 | 7/1987 | U.S.S.R. | 406/124 |

*Primary Examiner*—Johnny D. Cherry
*Assistant Examiner*—Andrew C. Pike
*Attorney, Agent, or Firm*—Kokjer, Kircher, Bowman & Johnson

[57] ABSTRACT

A pneumatic conveyor for granular materials which includes an apparatus for introducing the material into the entraining air stream. The apparatus includes a pressure vessel having means at its upper end for receiving allotments of material from an unpressurized source. Located within the vessel below the inlet is a feeder of the type having a hopper leading to reciprocating tray. The tray includes a plurality of inclined blades and provides a constant metered flow of the material between the blades to an outlet located adjacent the lower end of the pressure vessel. The lower end of the pressure vessel is connected to a transition throat leading directly to the conveying line through which passes the entraining air stream. The outlet of the feeder is spaced from the opening of the transition throat such that air pressure may pass about the exit and pressurize a lower portion of the pressure chamber outside of the feeder. The air pressure additionally passes through the material within the inside of the feeder to pressurize the upper portion of the pressure vessel. With this arrangement the pressure on each side of the material within the feeder is equal, allowing a normal gravity feed of the material through the hopper. The equalized pressures on the interior and exterior of the feeder aid in preventing damage to the feeder.

8 Claims, 1 Drawing Sheet

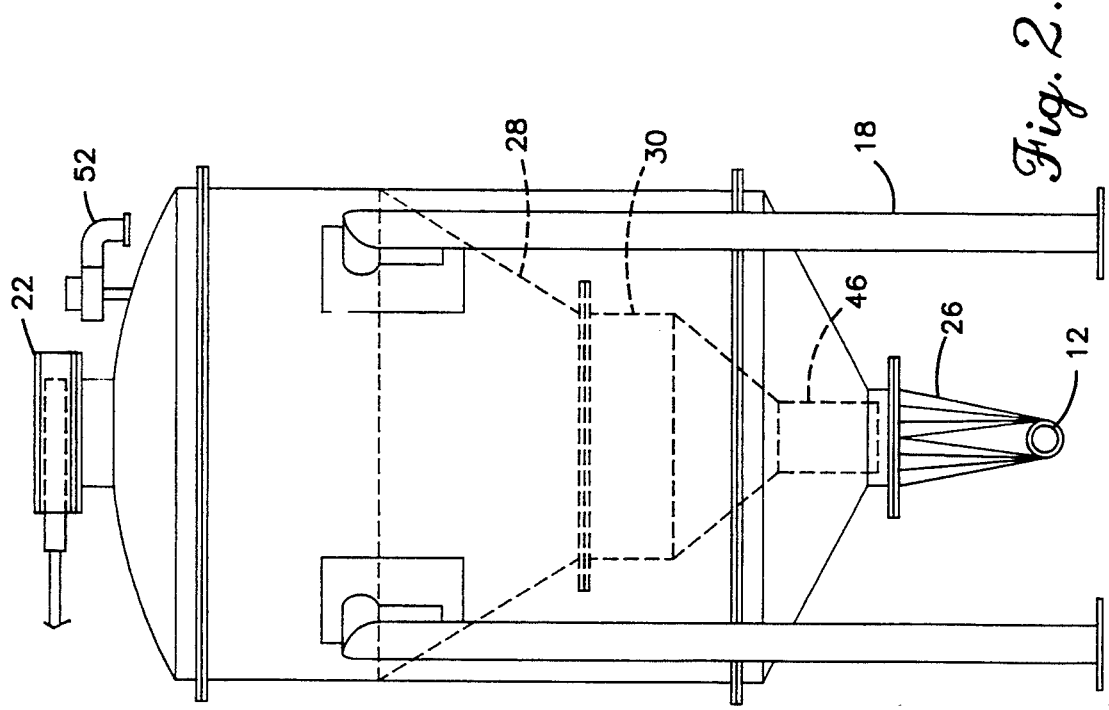
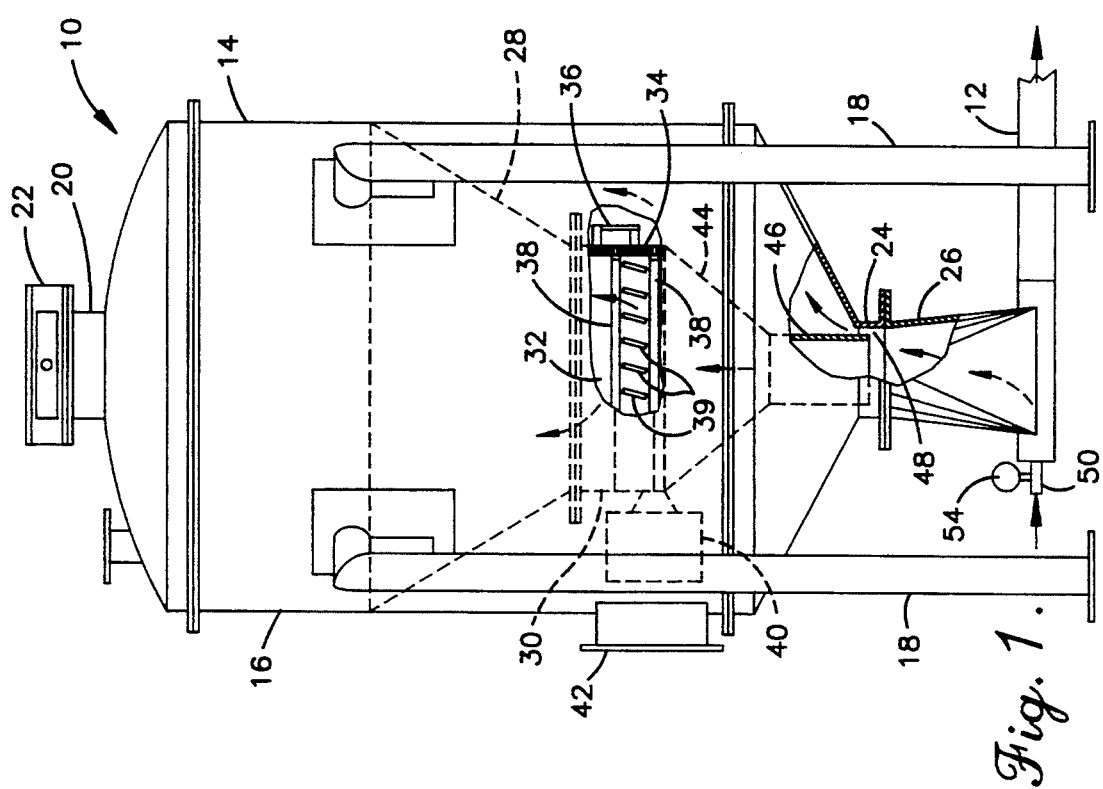

PNEUMATIC CONVEYOR FOR GRANULAR MATERIALS

This is a continuation of application Ser. No. 07/946,664, filed Sep. 18, 1992, now abandoned.

BACKGROUND OF THE INVENTION

1. Field of the Invention

The present invention relates in general to pneumatic conveyor systems. In particular, the present invention relates to an improved apparatus for introducing granular, cylindrical or flake material, particularly for human consumption, into the airstream of a pneumatic conveying system.

2. Description of the Related Art

The advantages of pneumatic conveying systems have long been known. For example, pneumatic conveying systems have few moving parts, and thus are reliable and relatively efficient. Additionally, when used with food products intended for human consumption, the closed nature of the pneumatic conveying system assists in preventing contamination of the food product.

However, there are certain food products which have heretofore not been suitable for conveyance by pneumatic systems. In particular, ready-to-eat (RTE) cereals such as Rice Krispies®, Cheerios®, Fruit Loops® and corn flakes, and RTE cereal components such as cylindrical (or other shaped) marshmallow bits, have experienced unsatisfactory results during pneumatic conveyance. During such attempts it was found that the RTE cereal would bridge in the vessel holding the cereal for introduction to the airstream or plug the pneumatic conduit, impeding air and product flow. The continued provision of the entraining air up stream of the bridge would cause increased pressure in this area of the conduit, with the pressure finally reaching a sufficient level to force the material to unclog the conduit.

This unbridging of the material was rather violent, and was immediately followed by a period of higher than normal conveyance speed due to the higher than normal pressure. Both of these events caused unacceptable amounts of breakage of the material, resulting in fines. Such fines are undesirable because they tend to coat the cereal, reducing its luster, and additionally compact the density of the cereal to make weight-based packages appear to contain an insufficient amount of the product by reducing the volume per unit weight.

The present inventors have determined that a major cause for the bridging of the cereal within the conduit is fluctuations in the amount of material introduced into the pneumatic conveying system. For example, materials are mainly introduced into a pneumatic conveying system by one of two methods. In the first method batches of the material pass from an unpressurized hopper open to the atmosphere, through a baffle chamber or pressure lock, and finally into a second hopper open to the conveying air stream, and thus at an elevated pressure equal to that in the conveying conduit. The pressure lock maintains the pressure within the second vessel, and the conveying airstream is continuous. In the second method the material is placed in a vessel and the vessel is sealed. Thereafter the conveying air is activated to convey all material from the vessel, at which point the air is deactivated, and the vessel opened to receive new material. This procedure is repeated as required.

While such a pressurized vessel is necessary to maintain the required pressure within the conveying conduit, the introduction of the material into the airstream has heretofore been non-uniform.

SUMMARY OF THE INVENTION

It is an object of the present invention to provide a pneumatic conveying system for ready-to-eat cereals.

Another object of the present invention is to provide an apparatus allowing substantially uniform flow rate of the material for introduction to the conveying air stream.

These and other objects are achieved by a pneumatic conveyor for granular materials which includes an apparatus for introducing the material into the entraining air stream. The apparatus includes a pressure vessel having means at its upper end for receiving allotments of material from an unpressurized source. Located within the vessel below the inlet is a feeder of the type having a hopper leading to reciprocating tray. The tray includes a plurality of inclined blades and provides a constant metered flow of the material between the blades to an outlet located adjacent the lower end of the pressure vessel. The lower end of the pressure vessel is connected to a transition throat leading directly to the conveying line through which passes the entraining air stream. The outlet of the feeder is spaced from the opening of the transition throat such that air pressure may pass about the exit and pressurize a lower portion of the pressure chamber outside of the feeder. The air pressure additionally passes through the material within the inside of the feeder to pressurize the upper portion of the pressure vessel. With this arrangement the pressure on each side of the material within the feeder is equal, allowing a normal gravity feed of the material through the hopper. The equalized pressures on the interior and exterior of the feeder aid in preventing damage to the feeder.

BRIEF DESCRIPTION OF THE DRAWINGS

The objects and features of the invention noted above are explained in more detail with reference to the drawings, in which like reference numerals denote like elements, and in which:

FIG. 1 is a side view of an apparatus according to the present invention; and

FIG. 2 is a front view of the apparatus of FIG. 1.

DETAILED DESCRIPTION OF THE INVENTION

With reference to FIG. 1, a pneumatic conveyor according to the present invention is generally designated by reference numeral 10. The conveyor includes a conduit 12 connected to a means 14 for introducing material into the conduit. The means 14 includes a pressure vessel 16 supported by a plurality of stands 18. The vessel 16 is impermeable to airflow and includes an inlet opening 20 at its upper end. Connected to the inlet opening 20 is a valve 22. The valve 22 may be opened to allow the material to be conveyed to be passed into the vessel 16 and thereafter closed such that the pressure within the vessel 16 is maintained. The valve 22 may be a simple valve opening the vessel to the atmosphere when open, or may be a pressure lock-type valve to retain the pressure within the vessel substantially constant.

The lower end of the vessel 16 includes an outlet throat 24 which communicates with a pickup adapter 26. The pickup adapter is in turn in communication with the conduit 12, with the adapter providing a smooth transition from the typically circular cross-section of the outlet throat 24 to the typically rectangular opening (not shown) in the upper portion of the conduit 12.

Mounted within the cavity of the pressure vessel 16 is a means for providing a metered product flow. This means generally consists of a hopper 28 having an upper end in at least close proximity to the walls of the pressure vessel so as to reliably receive the material passing downward from the inlet opening 20. The hopper 28 is tapered inwardly towards its bottom end, which is connected to a metering device 30.

The metering device may take any form which will provide a substantially constant gravimetric flow rate of the product as its output. Advantageously, the metering device 30 may take a form as that shown in U.S. Pat. No. 3,973,703 to Peschl (included herein by reference) and sold under the name Siletta ® by Massflow Feeding and Control Specialists of Charlotte, N.C. As is best described in the above-noted patent, such a metering device includes a framework 32 which supports an intermediate tray 34 by leaf springs 36 or other means allowing reciprocation of the tray with respect to the framework, and further includes seals 38 between the tray and framework. The tray 34 includes a plurality of inclined slats or vanes 39, between which the material may pass upon reciprocation of the tray with respect to the framework. The rate of reciprocation and/or angle of incline of the vanes may be varied to vary the output.

The metering device 30 will include appropriate drive means 40, which in the present embodiment includes a reciprocating or vibrating air motor operatively connected to the tray 34. The vessel 16 may include an appropriate view port 42 opening into the vessel such that the air motor may be viewed and serviced without undue trouble. It is noted that other types of reciprocating motors, such as electro-mechanical or electro-magnetic could be employed in place of the air motor.

Below the metering device 30 there may be provided a transition member 44 which leads to a reduced diameter metering outlet 46. As is best shown in FIG. 1, the lower end of the metering outlet is in close proximity to the outlet throat 24 of the vessel, such that material passing through the metering device and through the metering outlet 46 will pass into and through the outlet throat 24.

It is noted, however, that the outer diameter of the metering outlet 46 is less than that of the outlet throat 24, such that an outlet gap 48 is defined therebetween. The purpose for this outlet gap will be discussed more fully below.

Upstream of the pickup adapter 26, the conduit 12 is provided with a compressed air inlet nozzle 50 connected to a suitable supply of compressed air. Interposed between the supply of compressed air and the inlet nozzle 50 there may be appropriate sensors and/or valves. For reasons which will become apparent below, it is preferred that an adjustable pressure regulator be associated with the inlet nozzle 50. As should be apparent, the material passing through the metering outlet 46 and outlet throat 24 will pass through the pickup adapter 26 and fall by gravity into the conduit 12 where the material will be entrained within the air flow and pass downstream of the conduit.

During such operation the pressurized air will enter the conduit 12 through the inlet nozzle 50 at the position upstream of the pickup adapter 26. Since the entraining air flow from nozzle 50 is pressurized, this pressure will also be present in the opening providing communication between the conduit 12 and the adaptor 26, the adaptor itself. As is known in the art, a pressure differential will result in airflow, such that a higher pressure below the metering device 30 will result in an upward air flow tending to act against the dispensing motion of the material towards the pickup adapter.

However, the pressure will act through the material in the metering device such that the placement of the pressure vessel about the metering device 30 in the present invention ensures that the pressure of the conduit will pressurize the upper portion of the cavity defined by the pressure vessel 16. This will result in an equal pressure on each side of the material in the hopper 28 and metering device 30, such that, even though the material is passing into an entraining air stream, the actual dispensing of the material by the metering device will have the characteristics of standard gravity metering or dispensing, with the increased pressure of the conduit having no effect upon the metering.

This allows the metering device 30 to provide a constant volumetric flow rate of material to the metering outlet 46, which would not be possible without the presence of the surrounding pressure vessel 16.

As noted above, an outlet gap 48 is formed between the exterior of the metering outlet 46 and the interior of the outlet throat 24. This gap allows the pressurized air present in the pickup adapter 26 to pass into the pressure vessel 16 in the lower portion thereof, at the exterior of the metering device 30. As such, an equal pressure is maintained also on the interior and exterior of the metering device 30. This arrangement ensures that there is no unequal pressure situation upon the seals 38, and other elements of the metering device, preventing damage to the metering device 30.

The present arrangement of encasing the metering device within a pressure vessel and providing a gap adjacent the outlet throat of the vessel and outlet of the metering device ensures a constant volumetric flow of material with a long operating life for the metering device. This constant gravimetric flow rate from the metering device allows granular, cylindrical and flake material, and especially ready-to-eat cereals such as Rice Krispies ® and corn flakes, to be employed as the materials conveyed by the present conveyor 10. In particular, the constant gravimetric flow rate ensures a constant product flow through the conduit 12, reducing the pressure fluctuation within the conduit. This in turn reduces clumping of the material along the conduit which can lead to plugs or bridges. This reduces the number of fines produced in the material, allowing many such materials to be used with a pneumatic conveyor for the first time.

To further reduce the number of fines within the conveyor 10, it may be important to maintain the pressure and air flow of the entraining air within the conduit 12 to the minimum which will allow product flow. This is because increased product velocity within the conduit will translate directly into increased momentum, such that product hitting the interior of the conduit will strike with a greater force and be more likely to break and produce fines.

Along these same lines, it is preferred to avoid pressure variations by the use of the pressure regulator 54 associated with the inlet nozzle 50. In some pneumatic conveying systems the source of compressed air is provided by a positive displacement blower. With such positive displacement blowers, if a clog or plug were to be formed within the conduit, the constant air volume of such blowers will cause instantaneous increases in pressure within the conduit, which will be translated into greatly increased product velocity within the conduit just after the clog clears. This will lead to increased breakage and fines in the material, as noted above. The use of a pressure regulated system is greatly preferred, as the slight pressure increase just after the formation of a clog will cause the pressure regulator to reduce the air flow into the conduit, allowing the clog greater time to clear, not forcing the clog into a more compact configuration, and maintaining a substantially constant product velocity within the conduit after the clog is cleared.

The configuration of the conduit 12 may also have an effect upon pressure variations. For example, changes in downstream elevation will produce pressure changes within the conduit, leading to clumping as noted above. To reduce this effect, it is preferred that the conduit 12 rise to its final elevation within six meters (20 feet) horizontally of the pickup adapter 26, with no further changes in elevation until the conduit reaches the receiving point of the conveyor. It is also preferred that the interior of the conduit have a smooth surface, such as by employing dairy grade tubing and providing any bends within the conduit with large radiuses, on the order of twelve conduit diameters.

As with many pneumatic conveying systems, it may be necessary to provide a humidity control for certain types of material, and in particular for cereals containing marshmallow bits, or for marshmallow bits per se. Such humidity control can reduce sticking between the material and thus reduce clumping and bridging.

The operation of the device may be as a continuous system having a batch feed through the valve 22, with this valve taking the form of a pressure lock. However, it is preferred that the device operate as a batch system. In particular, prior to activating air supply the valve 22 will be opened and a batch of material placed in the vessel. The valve will be closed and the air supply activated, causing the vessel to pressurized.

The metering device will then dispense the metered flow of material until it is very nearly empty. At this point the air supply is stopped and the vessel immediately vented by an appropriate vent 52. This venting prevents the pressurized air within the vessel from continuing to convey the material. At this point the valve 22 is opened and the hopper receives a new batch of material. During this time the partially conveyed material simply rests within the conduit. Once the valve is sealed the air supply is activated, entraining the material within the conduit and pressurizing the vessel. The remaining steps are as noted above, and may be repeated as desired. To maintain a constant flow of material, there may be provided two vessels, with one vessel being filled while the other dispenses.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A pneumatic conveyor for granular, cylindrical, or flake material, said conveyor comprising:
    a conduit having an inlet nozzle adapted to be connected to a source of entraining air, said conduit adapted to allow the material entrained in said air to pass therethrough;
    a pressure vessel defining an interior cavity and having an inlet opening for receiving the material therethrough, a pressure valve operatively associated with said inlet opening and allowing a substantially airtight seal across said opening, and an outlet throat in communication with said conduit at a position downstream of said inlet nozzle; and
    a metering device mounted within said cavity at a position interposed between said inlet opening and said outlet throat and providing a metered gravimetric flow of the material received from said inlet opening to said outlet throat, an outlet conduit of said metering device extending into, but being spaced from, said outlet throat by an outlet gap defining an open passage through which the material does not flow, said outlet gap being located intermediate at least a portion of a periphery of said outlet conduit of said metering device and said outlet throat, whereby said cavity of said vessel, and an interior and exterior of said metering device, are pressurized at a level at least substantially equal to that in said conduit.

2. A conveyor as in claim 1, further comprising a pressure regulator operatively associated with said inlet nozzle of said conduit.

3. A conveyor as in claim 1, wherein said metering device includes:
    an inlet interposed between said pressure vessel inlet opening and said outlet conduit of said metering device;
    a tray between said inlet and said outlet conduit of said metering device, said tray being mounted for reciprocation in a plane substantially perpendicular to material flow through said vessel and including a plurality of vanes extending in spaced parallel relation perpendicular to said reciprocation; and
    means for causing said reciprocation.

4. A conveyor as in claim 3, wherein said inlet of said metering device includes a hopper tapered from a position in close proximity to interior walls of said pressure vessel to a position adjacent said tray.

5. A conveyor as in claim 3, wherein said means for causing reciprocation comprises an air motor.

6. A conveyor as in claim 3, wherein the material comprises a ready-to-eat cereal, and a mass of said cereal is located in said hopper.

7. A method of pneumatically conveying granular, cylindrical, and flake material, said method comprising the steps of:
    passing an entraining airstream through a conduit;
    introducing said material into a pressure vessel having an inlet and an outlet throat, with said outlet throat being in operative communication with said conduit, thereby subjecting said pressure vessel to a substantially constant air pressure;

passing said material through a metering device within said vessel intermediate said inlet and said outlet throat, and subject to said pressure, to dispense a substantially constant gravimetric flow from an outlet conduit of said metering device, said outlet conduit extending into, but being spaced from, said outlet throat by an outlet gap defining an open passage through which the material does not flow, said outlet gap being located intermediate at least a portion of a periphery of said outlet conduit of said metering device and said outlet throat, whereby said substantially constant flow of said material passes into said conduit through said outlet conduit of said metering device and is entrained within said airstream for passage through said conduit; and permitting air pressure from said airstream to pass through said outlet gap between said outlet conduit and said outlet throat to thereby maintain said substantially constant air pressure within said vessel.

8. A method as in claim 7, wherein said step of introducing said material comprises introducing a read-to-eat cereal.

* * * * *